Feb. 8, 1955  D. M. STRASSER  2,701,755
VALVE

Filed May 20, 1950  3 Sheets-Sheet 1

INVENTOR.
DALE M. STRASSER
BY
ATTORNEYS

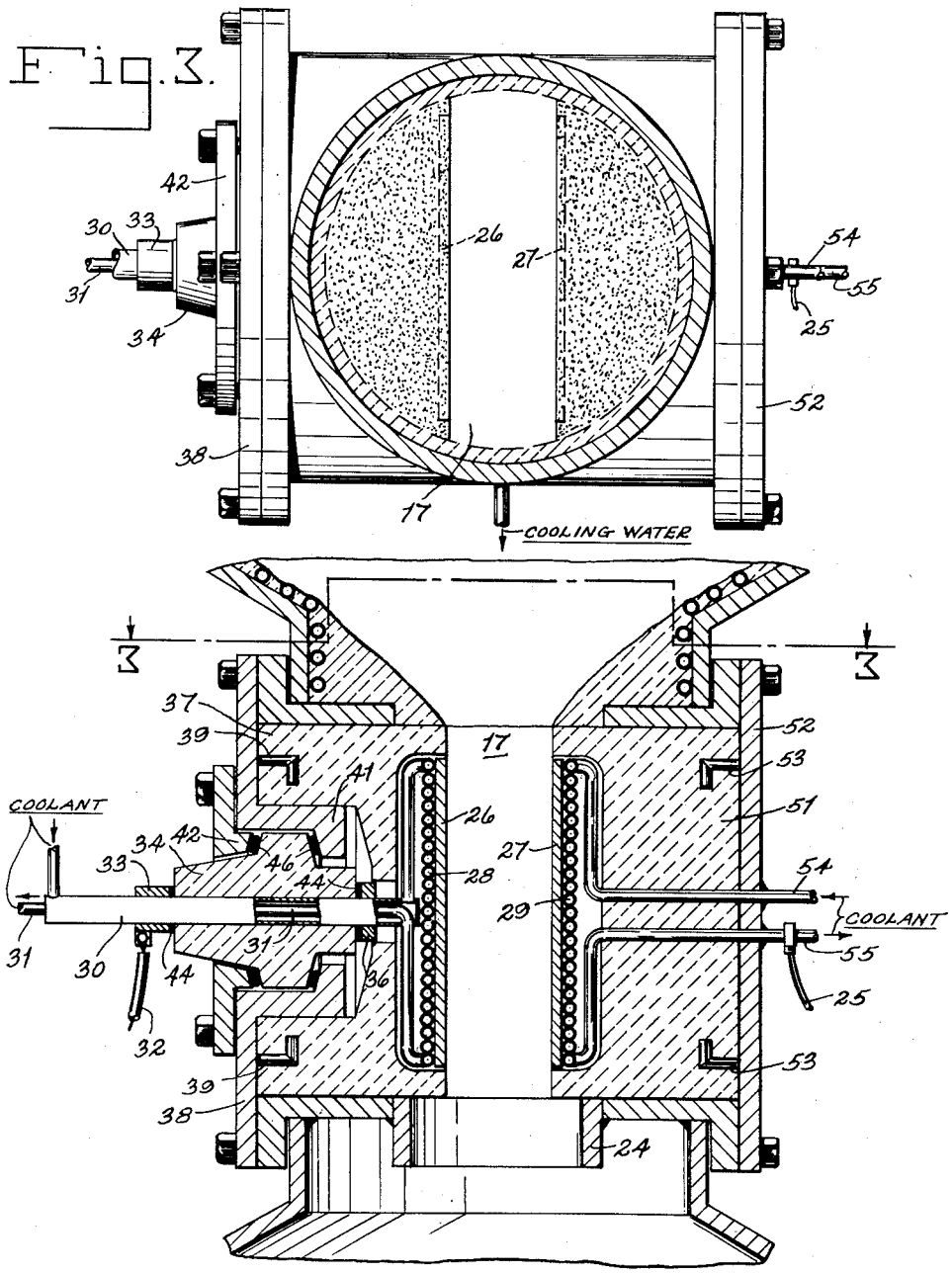

Feb. 8, 1955   D. M. STRASSER   2,701,755
VALVE

Filed May 20, 1950   3 Sheets-Sheet 3

INVENTOR.
DALE M. STRASSER
BY
ATTORNEYS

United States Patent Office 2,701,755
Patented Feb. 8, 1955

2,701,755

VALVE

Dale M. Strasser, Whittier, Calif., assignor to The Texas Company, New York, N. Y., a corporation of Delaware Application May 20, 1950, Serial No. 163,309

5 Claims. (Cl. 48—78)

This invention relates to a method and apparatus for the control of flow of a normally solid material in molten state. In one of its more specific aspects, it relates to a method and apparatus for control of the withdrawal of molten ash and slag from a vessel in which solid carbonaceous fuel is gasified by reaction with oxygen. The valve may be applied to furnaces, chemical processing and other industrial apparatus or processes in which a molten solid is handled.

The present invention is particularly suited to the gasification of coal by reaction with steam and oxygen to produce carbon monoxide and hydrogen in a flow-type gas generator. Oxygen-enriched air or commercially pure oxygen may be used in gas generation. Commercially pure oxygen is preferred, especially for the generation of gases in those instances in which nitrogen is undesirable in the product. In the generation of gas for ammonia synthesis, it may be desirable to use oxygen-enriched air.

The flow-type generator is characterized by the fact that the solid fuel in powder form is reacted with the oxygen and steam in dilute phase in an unpacked and unobstructed reaction zone. It is important that the reaction zone be compact presenting a relatively small amount of surface in comparison with its volume and that it be designed to minimize heat losses by radiation. It is preferable to arrange the inlet and outlet of the reaction zone relative to one another such that the reactants and reaction products flow relatively uniformly through the reaction zone, for example, as by introducing the reactants at or near one end and withdrawing them at or near the other.

The reaction zone is preferably generally cylindrical in shape with an internal surface not greater than one and one-half times the surface of a sphere of equal volume. Openings and "black body" surfaces are kept at a minimum to prevent loss of radiant heat from the reaction space. Free heat transfer by radiation is achieved in this type reaction vessel so that the entire reaction zone operates essentially at a single uniform temperature. The quantity of solid fuel supplied to the generator is just sufficient to react with the steam and oxygen. In this way, the flow type generator distinguishes materially from gasifiers employing a stationary, moving, or dense phase fluidized bed of solid fuel.

For successful operation of a generator of this type, the temperature throughout the generator must be maintained within the range of from about 2200 to 3000° F. Practical considerations, especially apparatus limitations, usually limit the maximum operating temperatures to about 2600° F. At these temperatures, the ash and slag from the fuel are molten and more or less fluid.

It is desirable to operate the gas generator at a pressure considerably above atmospheric pressure. The volume of product gas is considerably greater than the volume of reactants. Since the product gas is generally desirable as a source of hydrogen, carbon monoxide, fuel gas, or feed gas for the synthesis of hydrocarbons, ammonia, or the like, it is usually required at a pressure of several atmospheres. By operating the gas generator at an elevated pressure, costly compression of the product gas is avoided. This pressure may, for example, be somewhere within the range of from about 100 to about 1000 pounds per square inch gauge. Operation of the gas generator under pressure poses a knotty problem of control of the withdrawal of the molten ash and slag. It is most desirable to withdraw the product gases from the generator separately from the molten ash and slag. This permits efficient recovery of heat from the hot product gases by taking advantage of their high temperature level.

The reactants may be supplied to the flow type generator very effectively by introducing separately a stream of oxygen and a stream of steam containing powdered coal into admixture with one another within the reactor at relative velocities. Inlet velocities of 100 to 200 feet per second give very satisfactory mixing when the streams are introduced through concentric tubes. It is preferable to preheat the steam and coal to a temperature above about 600° F. and preferably to a temperature within the range of 900 to 1200° F. It is desirable, but not necessary, to preheat the oxygen. Suitable oxygen preheat temperatures may go as high as 600 to 800° F. Above these temperatures oxygen becomes reactive with metals commonly used in apparatus.

A flux may be used to reduce the fusion temperature of the slag or to render it more fluid. Lime is generally suitable as the flux, where one is indicated, although with some coals it may be desirable to add fluorite, silica or alumina to increase the quantity of fluidity of the slag. The addition of lime to the generator not only increases fluidity of the slag and decreases the fluxing temperature but also effects removal of at least a portion of the hydrogen sulfide from the product gas stream. The amount of lime required as flux may be determined from the composition of the coal ash. In general, the most satisfactory fusion is obtained when the sum of the lime and magnesia in the feed is approximately equal in weight to the sum of the silica and alumina. The lime and magnesia may be added in the form of the carbonates, but should be converted to equivalent quantities of the oxides in determining the quantity of flux required.

The reactor is preferably constructed with an outer steel shell capable of withstanding an internal pressure considerably in excess of the operating pressure and provided with means for cooling the wall of the generator to prevent overheating of the steel shell. It has been found that a well insulated generator with any of various high temperature refractory linings is often unsuitable for this type service. Preferably, the generator is provided either with no convention insulation or with only a minor amount between the cooling surfaces and the reaction zone. Cooling of the walls of the reactor causes slag to freeze and accumulate to form a refractory lining for the reactor. This lines the reactor with a stable surface which is not subject to attack or erosion from the reactants. Any portion of the generator wall which normally would be subjected to erosion is continuously replaced by freezing of slag. Thus the lining is automatically renewed and kept at a relatively uniform thickness. The slag forms an effective radiating surface at reaction temperatures preventing heat losses from the reaction zone by radiation. Heat losses by conduction are relatively small, the frozen slag acting as insulation.

Fig. 2 is a vertical cross-sectional view through the preferred embodiment of the valve of Fig. 1 showing details of its construction.

Fig. 3 is a horizontal cross-sectional view of the preferred embodiment of the valve taken along the plane 3—3 of Fig. 2.

In accordance with the present invention the control of molten ash and slag is accomplished by a novel valve. The valve comprises a walled conduit through which the molten material may be passed, means for cooling the material adjacent the walls of the conduit to cause solidification of material therein, and means for heating the material within the conduit to melt solidified material. The cooling means causes the molten material to solidify along the wall of the conduit inhibiting flow, while the heating means permits flow at a point removed from the wall. By controlling the relative amounts of heating and cooling, the flow of the molten material may be adjusted as desired. By applying only cooling to the molten material the passageway may be completely closed with solidified material. On the other hand, by applying heating, solidified material may be again rendered molten thereby opening the passageway to the desired extent. In normal operation, both the heating and cooling are applied simultaneously to control the rate of flow through the conduit.

Figure 1:
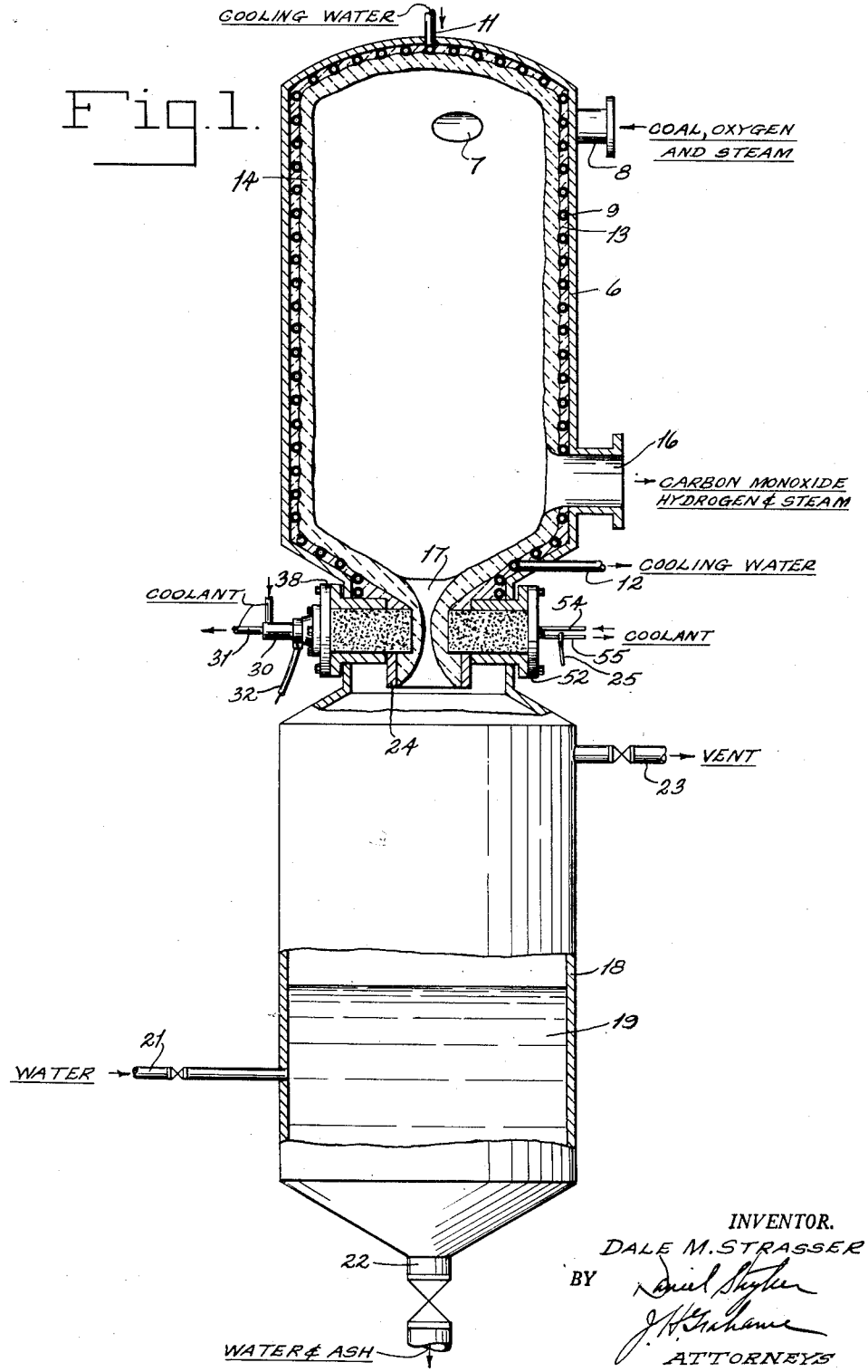
Fig. 1 is an elevational view, partly in cross section, a flow-type gas generator incorporating a preferred embodiment of the valve of this invention.

With reference to Fig. 1 of the drawing, a flow-type gas generator comprising a vertical cylindrical outer shell 6 is provided with inlet 7 to which coal, oxygen and steam are supplied through a tangentially disposed feed pipe 8. The inlet for these reactants is in the upper end of the generator and is arranged to discharge the reactants tangential to the inner surface of the generator. Adjacent the shell 6 on the inside of the generator, are cooling pipes 9 to which cooling water is supplied through line 11 and from which cooling water is discharged through line 12.

The cooling pipes 9 are covered with only a thin layer of conventional insulation 13 to protect the tubes during the starting up period. Once the generator is in operation a layer of slag 14 forms along the inner wall of the reactor protecting the cooling tubes and forming an insulating blanket between the reaction zone and the wall of the reactor. The reactor wall itself is kept at a safe operating temperature by the cooling tubes. Product gases consisting essentially of carbon monoxide, hydrogen, and unconverted steam, are discharged through an outlet line 16.

Molten ash is discharged from the generator through a conduit 17 into an accumulator 18 where the molten slag is dropped into a body of water 19 supplied to the generator through line 21. The molten ash, upon contacting the water, is shock cooled and forms small particles of solid which are discharged with water through outlet line 22. Steam and accumulated gases may be vented from accumulator 18 through line 23. A slag drip ring 24 is provided at the top of the accumulator to prevent the molten slag from running down the outer wall of the accumulator.

The valve of the present invention is installed between the generator 6 and the accumulator 18 to control the flow of molten ash through the conduit 17 from the generator. This valve is illustrated in detail in Figs. 2 and 3. The valve comprises a pair of opposed parallel plates 26 and 27 at opposite sides of the conduit 17. The plates 26 and 27 are used for heating by dielectric heating any solid ash which may be present between the plates. Plate 26 is cooled by cooling coil 28, and plate 27, by cooling coil 29. Plate 27 and cooling coil 29 are grounded to the apparatus and connected by conductor 25 to the grounded side of a suitable source of electrical energy. Plate 26 and cooling coil 28 are insulated from the apparatus. Coolant is supplied to cooling coil 28 through a pipe 30 and discharged therefrom through a pipe 31. Power is supplied to plate 26 through conductor 32, which is attached by collar 33 to cooling conduit 30. The cooling conduit 30 is insulated from the apparatus by an insulating sleeve 34 of a suitable ceramic material having a collar around its midsection. A spacer 36 attached to conduit 30 serves to position the sleeve 34 relative to conduit 30 and plate 28. A cast block of refractory insulation 37, attached to a cover plate 38 by lugs 39, surrounds the various parts so that only plate 26 is exposed. The insulating sleeve 34 is held in place by flanges 41 associated with the cover plate 38 and by a sealing sleeve 42 which engage the collar of the sleeve. Gaskets 44 form a seal between conduit 30 and insulating sleeve 34. A similar pair of gaskets 46 form a seal between insulating sleeve 34 and cover plate 38. Cover plate 38, insulating block 37, plate 26, cooling coil 28, insulating sleeve 34, and sealing sleeve 42 form a unitary plate assembly which may be removed in its entirety from the apparatus. This permits replacement of the power plate 26 with a minimum amount of trouble.

Similarly, plate 27 and associated cooling coil 29 are assembled in a cast refractory block 51 which is attached to a cover plate 52 by lugs 53. Since this plate is grounded to the equipment, it is not necessary to provide electrical insulation.

A suitable liquid coolant, e. g. oil, is supplied to the cooling coil 28 through pipe 30 and discharged therefrom through pipe 31 which is disposed within pipe 30. Similarly, coolant is supplied to cooling coil 29 through pipe 54 and discharged therefrom through pipe 55.

Figure 4:
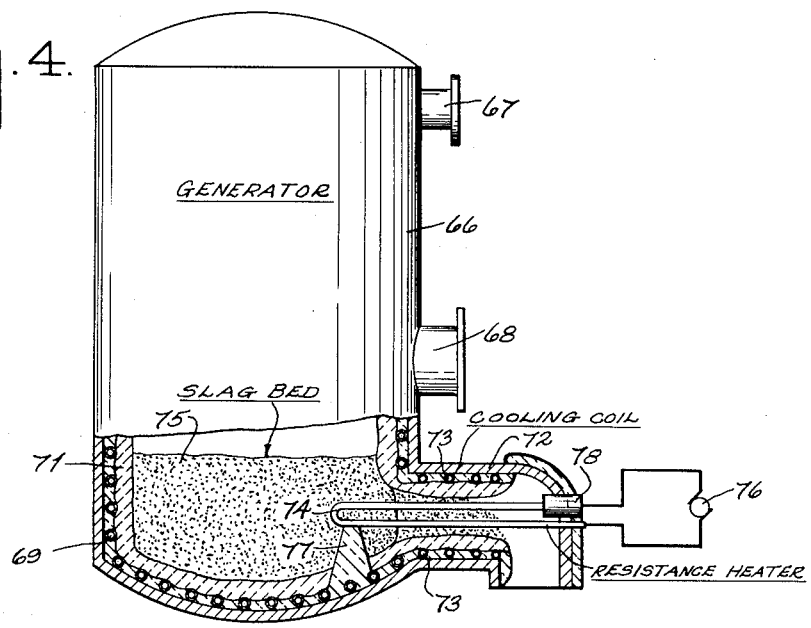
Fig. 4 illustrates a flow-type generator incorporating a second embodiment of the valve of my invention.

With reference to Fig. 4, another modification of the valve is illustrated. In this modification, a generator 66, similar to the generator illustrated in Fig. 1, is provided with an inlet 67 for the induction of reactants and an outlet 68 for product gas. Cooling coils 69 protect the wall of the generator and form a layer of slag 71 on its inner surface. The generator 66 is provided with a horizontally disposed discharge nozzle 72 in the lower portion of the generator. The discharge nozzle is provided with a cooling coil 73, separate and apart from the cooling coil 69 of the generator. A U-shaped carbon heating element 74 is disposed along the interior of the nozzle spaced from the cooling coil. The heating element may take another form or be made of other material. Power is supplied to the heating element from a source 76. The heating element is supported by a refractory support 77 disposed within the generator and by the wall of the nozzle. An insulating sleeve 78 provides electrical insulation between the heating element and the metallic wall of the discharge nozzle. This sleeve may suitably be of ceramic material. The other end of the heating element may be grounded to the generator. The discharge end of the nozzle, or valve, is provided with insulation 79 to prevent solidification of ash within the nozzle after it passes the heating element.

Figure 5:
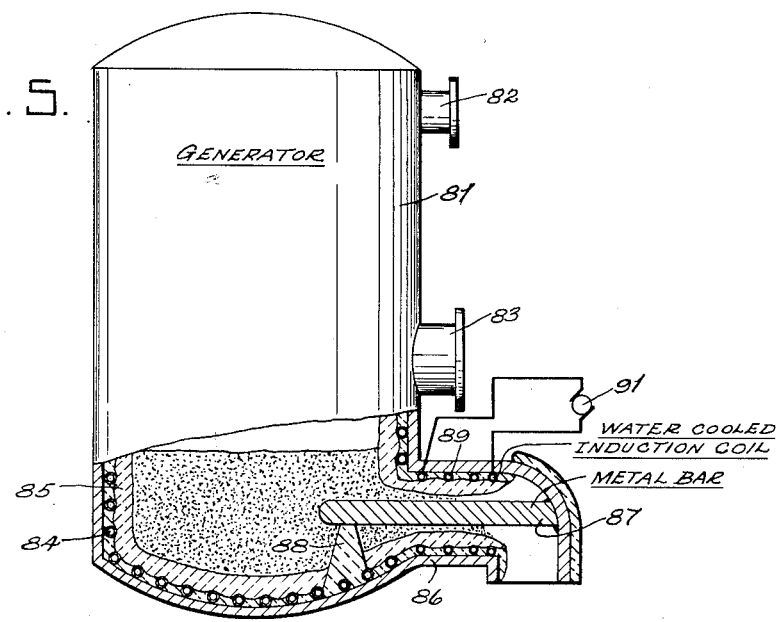
Fig. 5 illustrates a flow-type generator in which still a third embodiment of the valve of my invention is incorporated.

Fig. 5 illustrates a third embodiment of the valve of this invention. A generator 81 is provided with an inlet 82 for the introduction of reactants and an outlet 83 for the discharge of product gas. The generator wall is cooled by a cooling coil 84 which forms a refractory lining 85 by solidification of molten ash. A horizontally disposed discharge nozzle 86 is associated with the lower portion of the generator. A metal bar 87 extends through the opening in the nozzle into the generator where it is supported by a refractory support 88. The opposite end of the bar may be attached to the wall of the discharge nozzle. A water cooled induction coil 89 is disposed within the discharge nozzle to provide both heating and cooling. Power from a suitable source 91 is supplied to the induction coil.

In the operation of the apparatus disclosed in Figs. 1 to 3, the generator is put in operation by igniting a combustible mixture of coal, oxygen and steam to produce carbon monoxide, as is known in the art. The generator is operated at a temperature above about 2200° F. such that the ash and slag are in molten form. Ash and slag solidify on the inner wall of the generator to form a lining 14. After this lining is built up to a nominal depth, the excess molten ash drains to the bottom of the reactor and is discharged therefrom through conduit 17. Coolant is circulated through cooling coils 28 and 29 to solidify the molten ash in the conduit 17. When the conduit 17 is closed completely or to the desired extent, power is supplied to the plates 26 and 27 from a suitable source, not illustrated, to supply heat to the solidified slag by dielectric heating. The molten ash may be discharged from the generator either continuously or intermittently. Dielectric heating is known in the art and does not, in itself, form any part of the present invention. By circulating water through the cooling coils and at the same time supplying power for dielectric heating, it is possible to maintain a coating of solidified ash on the plates 26 and 27 and maintain an opening of controlled size in the conduit 17. The extent of the opening is indicated by the amount of gas discharged through vent 23 from the accumulator 18. By adjusting the rate of supply of coolant, or the supply of power to the plates, the operator may maintain the desired opening in conduit 17 to permit a differential pressure between the generator 6 and the accumulator 18. Either the pressure in accumulator 18 or the volume of gas passing through vent line 23 may be used as a criterion for valve control. The valve control may be accomplished either manually or automatically.

In operation of the modification illustrated in Fig. 4, molten ash accumulates in the lower portion of the generator to form a slag bed 75. Coolant is circulated through cooling coil 73 causing the molten ash to solidify in the discharge nozzle 72. The molten ash may be withdrawn continuously or intermittently from the generator by supplying power to the heating element 74. As the element 74 is heated it melts the slag adjacent the element and permits flow from the generator through the discharge nozzle. The extent of the opening of the valve may be controlled by balancing the cooling against the heating. In continuous operation it is desirable to continuously circulate the cooling water through the cooling coil and at the same time supply heat to the heating element. A balance between heat supplied by the element and heat extracted by the cooling coil provides the desired valve opening.

The modification illustrated in Fig. 5 is operated in substantially the same manner as that of Fig. 4. Heat is supplied in this instance by induction in the metal bar 87. Induction heating is old and well known in the art and does not, in itself, form any part of the present invention. This modification applies the principle of induction heating to supply heat at the interior of the valve. At the same time coolant is circulated through the induction coil 89 to solidify molten ash and slag around the periphery of the nozzle 86. By adjusting the relative heating and cooling, it is possible to open or close the valve to the desired extent. Molten ash may be withdrawn continuously or intermittently.

From the foregoing detailed description of various embodiments of the valve of my invention, it will be evident that the valve comprises a conduit with a passageway for the flow of molten normally-solid material, means for cooling the wall of the conduit for the solidification of molten material adjacent the wall and means for supplying heat to the material within the passageway to permit flow therethrough.

Obviously many modifications and variations of the invention as hereinbefore set forth may be made without departing from the spirit and scope thereof and, therefore, only such limitations should be imposed as are indicated in the appended claims.

I claim:

1. A valve for control of flow of molten normally solid material which comprises a walled conduit, a pair of spaced plates forming a portion of the walls of the conduit, means for imposing an alterating electrical potential of a voltage and frequency sufficient for dielectric heating of said solid material between said plates, and means for cooling said plates by an amount sufficient to maintain a layer of said material in solid form on said plates.

2. In combination with a coal-fired carbon monoxide and hydrogen gas generator producing molten slag, a conduit at the lower portion of the generator receiving molten slag from the generator, a pair of spaced plates forming a portion of the walls of the conduit, means for imposing an alternating electrical potential of a voltage and frequency sufficient for dielectric heating of said solid material between said plates, and means for cooling said plates by an amount sufficient to maintain a layer of said material in solid form on said plates.

3. A valve for control of flow of molten normally solid material which comprises a walled conduit, dielectric heating means comprising electrodes disposed transversely of said conduit for dielectric heating of said material within said conduit, and means for cooling the walls of said conduit by an amount sufficient to maintain a layer of said material in solid form on said walls.

4. A valve for control of flow of molten normally solid material which comprises a walled conduit, a pair of electrically-conductive parallel spaced plates forming a portion of the walls of said conduit, means for applying to said plates an alternating electrical potential of a voltage and frequency sufficient for dielectric heating of said solid material between said plates, and means including electrically-conductive cooling tubes in contact with said plates for cooling said plates by an amount sufficient to maintain a layer of said material in solid form on said plates.

5. A method for control of flow of molten normally solid material through a conduit which comprises cooling the confining wall of the conduit substantially completely about the flowing molten material at a rate sufficient to maintain a layer of said material in solid form on said confining wall substantially completely surrounding said flowing molten material, and simultaneously heating said material dielectrically in the interior of said conduit within the confines of said solid layer at a rate sufficient to maintain said material in molten condition in the interior portion of said conduit, the said cooling and heating rates being coordinated to thereby control the thickness of said solid layer and the effective cross-section of the molten material within said layer to thereby regulate the flow of said material through said conduit.

References Cited in the file of this patent

UNITED STATES PATENTS

| Number | Name | Date |
|---|---|---|
| 469,454 | Rogers | Feb. 23, 1892 |
| 745,863 | Kessmeier | Dec. 1, 1903 |
| 859,133 | Snyder | July 2, 1907 |
| 1,458,522 | Clark | June 12, 1923 |
| 1,593,054 | Arbeit | July 20, 1926 |
| 1,603,221 | Thomson | Oct. 12, 1926 |
| 2,085,450 | Rohn | June 29, 1937 |
| 2,108,361 | Asakawa | Feb. 15, 1938 |
| 2,186,718 | Ferguson | Jan. 9, 1940 |
| 2,188,927 | Slayter | Feb. 6, 1940 |
| 2,194,814 | Stewart | Mar. 26, 1940 |
| 2,217,743 | Greenewalt | Oct. 15, 1940 |
| 2,225,373 | Goss | Dec. 17, 1940 |
| 2,339,607 | Smith | Jan. 18, 1944 |
| 2,371,604 | Brennan | Mar. 20, 1945 |
| 2,476,283 | Castellan | July 19, 1949 |
| 2,527,545 | Goss | Oct. 31, 1950 |

FOREIGN PATENTS

| 587,950 | Great Britain | May 9, 1947 |